C. HICKEY.
MUZZLE.
APPLICATION FILED JAN. 17, 1913.

1,080,446.

Patented Dec. 2, 1913.

Witnesses:
Christ Feinle, Jr.
[signature]

Inventor,
Charles Hickey
By Victor J. Evans,
Attorney.

COLUMBIA PLANOGRAPH CO., WASHINGTON, D. C.

UNITED STATES PATENT OFFICE.

CHARLES HICKEY, OF BLACKWELL, OKLAHOMA.

MUZZLE.

1,080,446.   Specification of Letters Patent.   Patented Dec. 2, 1913.

Application filed January 17, 1913. Serial No. 742,655.

*To all whom it may concern:*

Be it known that I, CHARLES HICKEY, a citizen of the United States, residing at Blackwell, in the county of Kay and State of Oklahoma, have invented new and useful Improvements in Muzzles, of which the following is a specification.

The invention relates to animal husbandry and more particularly to muzzles and has for an object to provide a muzzle for use on colts or calves.

The invention embodies, among other features, a muzzle that can be readily applied to the animal and which can be adjusted to fit young or older animals whose heads and necks are correspondingly different in size and shape.

Figure 1:
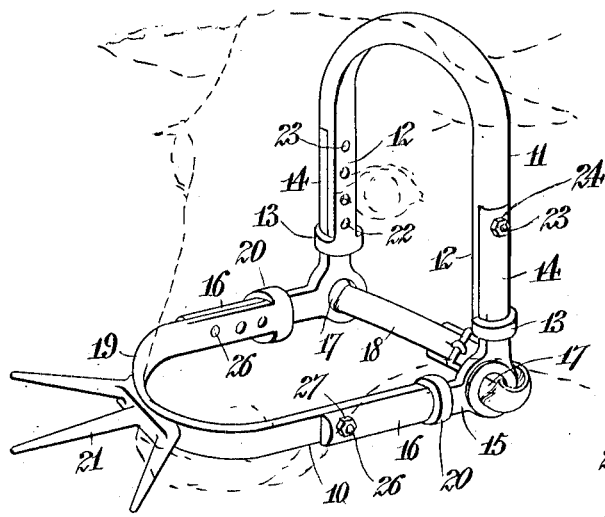
Figure 2:
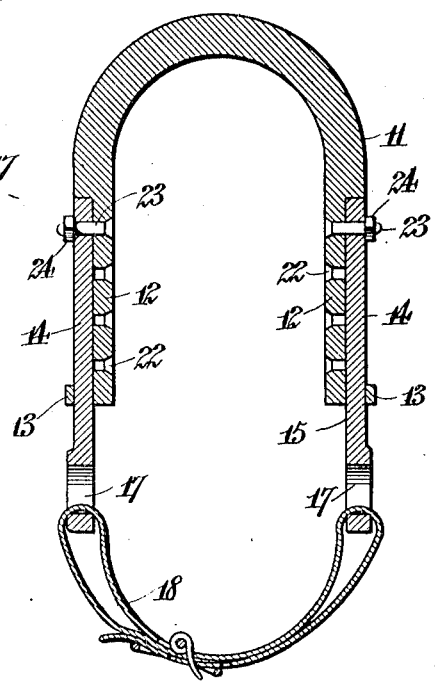
Figure 4:
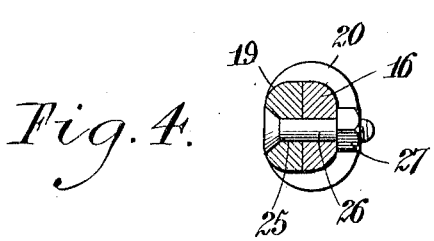
Figure 3:
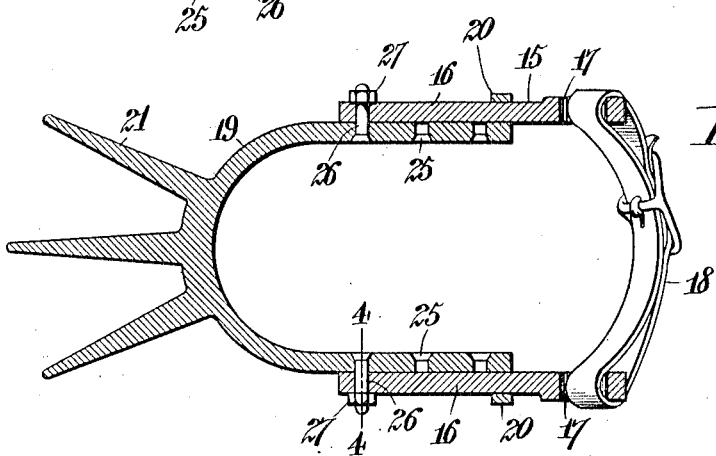

In the further disclosure of the invention reference is to be had to the accompanying drawings, constituting a part of this specification, in which similar characters of reference denote corresponding parts in all the views, and in which:

Figure 1 is a perspective view of the device, showing the same in applied position on the head of a calf, the head of the calf being shown in dotted lines; Fig. 2 is a vertical sectional view taken through the neck yoke; Fig. 3 is a horizontal sectional view taken through the member projecting forwardly from the lower end of the neck yoke; and Fig. 4 is a vertical transverse sectional view taken on the line 4—4 in Fig. 3.

Referring more particularly to the views, I disclose a muzzle 10 including a neck yoke 11 having reduced and flattened portions 12 and terminating at the lower ends in eyes 13, through which are mounted to slide uprights 14 of an L-shaped attaching member 15 having forwardly projecting bars 16, eyelets 17 being formed at the inner ends of the uprights 14 and the bars 16 and adapted to receive a strap 18 for attaching the muzzle to the animal. A U-shaped guard member 19, similar in shape to the neck yoke 11, terminates at the ends in eyes 20 having the bars 16 slidable therethrough and a series of diverging prongs 21 are secured to or formed with the guard member 19 and project forwardly from the medial portion thereof.

The reduced portions 12 of the neck yoke 11 are provided with a series of openings 22 and transversely extending pins 23 are carried on the upper ends of the uprights 14 and are adapted to pass through the openings 22 and secured to the neck yoke by nuts 24, it being thus seen that the neck yoke 11 can be vertically adjusted on the attaching member 15. Similarly, the ends of the U-shaped guard member 19 are provided with openings 25 and the forward ends of the bars 16 are provided with transverse pins 26 adapted to pass through the openings 25, with nuts 27 adapted for connection with the pins 26 to secure the guard member on the bars 16 of the attaching member 15, it being thus seen that the guard member 19 can be horizontally adjusted on the attaching member in the same manner that the neck yoke 11 is vertically adjusted on the attaching member.

In the use of the device described, the yoke 11 is passed over the neck of the animal and depends so that the strap 18 connecting opposing portions of the attaching member 15 will pass beneath the neck of the animal, thus securing the muzzle in position so that the guard member 19 will lie substantially horizontal with the prongs 21 projecting forwardly immediately above the nose of the animal.

From the foregoing description it will be apparent that the device described is so arranged that it can be used on a calf or similar animal having a small head or on an animal having a larger head, the neck yoke 11 and guard member 19 being both independently adjustable on the attaching member 15 for this purpose.

Having thus described my invention, I claim:

In a muzzle, the combination with a plurality of L-shaped attaching members, of a plurality of vertical uprights forming a part of the attaching members and integral therewith, a plurality of horizontal forwardly extending bars forming a part of the attaching members and integral therewith, a neck yoke mounted to slide on the said uprights, a guard member mounted to slide on the said bars, a strap on the said attaching member for attaching the same to the head of an animal, means for adjustably securing the said neck yoke on the uprights of the attaching member, and means for adjustably securing the said guard member on the bars of the said attaching member.

In testimony whereof I affix my signature in presence of two witnesses.

CHARLES HICKEY.

Witnesses:
M. W. CRAMER,
O. J. NEAL.

Copies of this patent may be obtained for five cents each, by addressing the "Commissioner of Patents, Washington, D. C."